United States Patent
Namm et al.

(10) Patent No.: US 10,264,406 B1
(45) Date of Patent: Apr. 16, 2019

(54) DEVICE, SYSTEM AND METHOD FOR CAUSING A NOTIFICATION DEVICE TO PROVIDE AN INDICATION OF A SEARCHED AREA

(71) Applicant: MOTOROLA SOLUTIONS, INC., Chicago, IL (US)

(72) Inventors: Joseph C. Namm, Plantation, FL (US); Craig F Siddoway, Davie, FL (US); Bert Van Der Zaag, Wheat Ridge, CO (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/046,205

(22) Filed: Jul. 26, 2018

(51) Int. Cl.
 *H04W 24/00* (2009.01)
 *H04W 4/029* (2018.01)
 *H04W 4/33* (2018.01)

(52) U.S. Cl.
 CPC ............ *H04W 4/029* (2018.02); *H04W 4/33* (2018.02)

(58) Field of Classification Search
 CPC ................... H04W 4/029; H04W 4/33
 USPC ...................................................... 455/456.1
 See application file for complete search history.

(56) References Cited

U.S. PATENT DOCUMENTS

| 6,967,674 | B1 | 11/2005 | Lausch |
| 7,598,856 | B1* | 10/2009 | Nick ............... G01C 21/206 340/539.13 |
| 7,978,085 | B1 | 7/2011 | Kearns et al. |
| 9,042,929 | B2 | 1/2015 | Kuehner |
| 9,288,627 | B2* | 3/2016 | Irish ..................... H04W 4/025 |
| 2017/0220112 | A1* | 8/2017 | Nakamura ............. G06F 3/016 |

\* cited by examiner

*Primary Examiner* — Huy C Ho
(74) *Attorney, Agent, or Firm* — Perry + Currier, Inc.

(57) ABSTRACT

A device, system and method for causing a notification device to provide an indication of a searched area is provided. A device comprises: controller; and a communication unit configured to communicate with one or more sensors, the one or more sensors configured to track: a path of a user; and one or more of a reach of the user and hand location of the user. The controller receives, from the one or more sensors, via the communication unit, sensor data indicative of the path and one or more of the reach and the hand location of the user at a location. The controller identifies, from the sensor data, an area searched by the user at the location. The controller causes a notification device to provide an indication of the area searched by the user.

18 Claims, 7 Drawing Sheets

DEVICE, SYSTEM AND METHOD FOR CAUSING A NOTIFICATION DEVICE TO PROVIDE AN INDICATION OF A SEARCHED AREA

BACKGROUND OF THE INVENTION

In emergency situations, when human life is at risk, every second counts. When searchers, such as fire crews, are searching for victims in buildings the searchers may be blinded by darkness and smoke. Searchers are generally trained to search by hand in such conditions using methods that may be slow and may lead to incomplete searches. Such incomplete searchers may further lead to previously searched areas being searched a second time which is generally a waste of human and technical resources.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

An aspect of the speculation provides a device comprising: a communication unit configured to communicate with one or more sensors, the one or more sensors configured to track: a path of a user; and one or more of a reach of the user and hand location of the user; and a controller communicatively coupled to the communication unit, the controller configured to: receive, from the one or more sensors, via the communication unit, sensor data indicative of the path and one or more of the reach and the hand location of the user at a location; identify, from the sensor data, an area searched by the user at the location; and cause a notification device to provide an indication of the area searched by the user.

An aspect of the speculation provides a method comprising: receiving, at a controller, from one or more sensors, via a communication unit, sensor data indicative of a path and one or more of a reach and a hand location of a user at a location, the communication unit configured to communicate with the one or more sensors, and the one or more sensors configured to track: the path of the user; and one or more of the reach of the user and the hand location of the user; identifying, at the controller, from the sensor data, an area searched by the user at the location; and causing, using the controller, a notification device to provide an indication of the area searched by the user.

Figure 1:
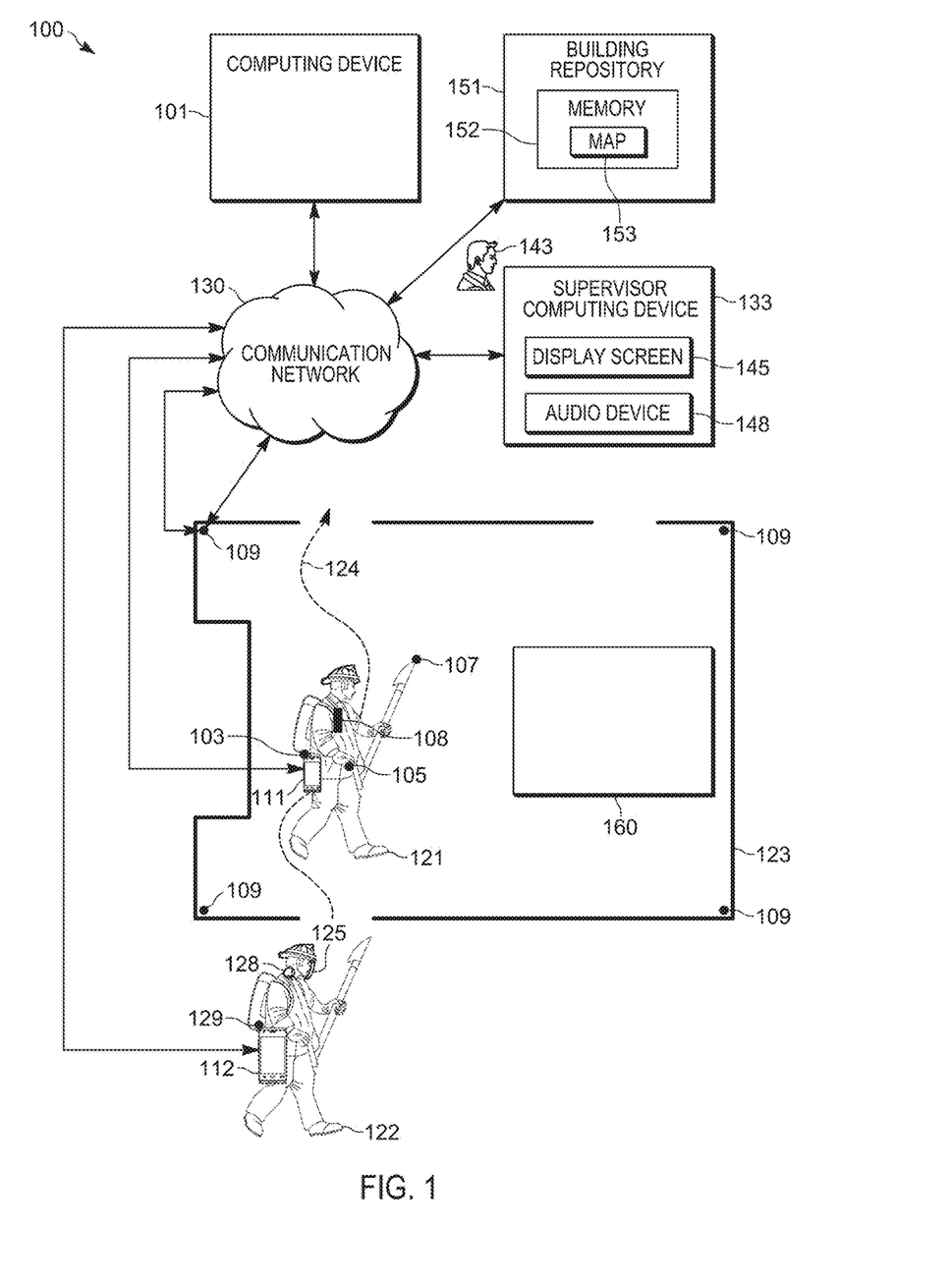
FIG. 1 depicts a system for causing a notification device to provide an indication of a searched area in accordance with some examples.

Attention is directed to FIG. 1, which depicts a system 100 for causing a notification device to provide an indication of a searched area. The system 100 comprises a computing device 101, sensors 103, 105, 107, 108, 109, a first communication device 111, and a second communication device 112. The first communication device 111 is carried by a first user 121 and the second communication device 112 is carried by a second user 122. The first user 121 generally performs a primary search of a location 123, for example a room filled with smoke and/or a dark room, and the like. The second user 122 generally performs a secondary search of the location 123, after the first user 121 has performed the primary search. As such, the first user 121 is depicted in FIG. 1 as being inside the location 123 performing a primary search of the location 123, while the second user 122 is outside the location 123, for example following the first user 121 at a later time, to enter the location 123 to perform the secondary search. Each of the users 121, 122 may be a first responder, and the like, such as member of a fire crew; however, each of the users 121, 122 may be any user searching the location 123 including, but not limited to, first responders (e.g. police officers, fire fighters, emergency medical technicians, and the like), civilian searchers, and the like. Indeed, the location 123 may be site of a public safety incident such as a fire, and the like. Furthermore, while the location 123 is depicted as being a room, for example, of a building, the location 123 may be any type of location where a search is to be conducted.

Furthermore, while in FIG. 1 the users 121, 122 are depicted in side views to better show their associated components, a person of skill in the art understands the first user 121 is travelling between doorways (e.g. entrances and/or exits) of the location 123, and the second user 122 is travelling in a direction that will cause the second user 122 to be proximal a doorway initially used by the first user 121 to enter the location 123.

In general, the first user 121 may search the location 123 along a path 124, using their hand and/or a tool, such as an axe and the like, to reach out and/or sweep sideways from the path 124, and/or along the path 124, to search for victims and the like. For example, the first user 121 may crawl between two doorways (e.g. entrances and/or exits) of the location 123 along the path 124 searching for victims; for example, as the first user 121 crawls along the path 124, the first user 121 reaches with their hands and/or a tool to manually sweep an area to the left and right of the path 124 (and/or perpendicular to the path 124) to search for victims. The user 121 121 may make frequent contact with a wall, structure, and/or obstacles with a hand and/or a tool to maintain a perimeter path to aid in navigating the location 123; hence a position of a hand and/or tool of the user 121, as the user 121 searches the location 123, may provide an indication a shape of the location 123. As depicted, the sensor 103 may comprise a location tracking device and/or a location sensor of the first communication device 111, such as a Global Positioning System (GPS) device and/or an indoor tracking device compatible with indoor searching (including, but not limited to dead reckoning devices, gyroscopes, beacon tracking sensors, and the like, and/or a device which uses simultaneous localization and mapping (SLAM) algorithms), and the like. The location sensor 103 may be internal or external to the first communication device 111.

The sensor 105 may comprise a glove sensor disposed on a glove worn by the first user 121, and glove sensor data generated by the glove sensor 105 is generally indicative of one or more of a reach and a hand location of the first user 121 (e.g. while the first user 121 is wearing a glove that includes the glove sensor 105).

Similarly, the sensor 107 may comprise a tool sensor disposed on one or more tools carried by the first user 121, and tool sensor data generated by the tool sensor 107 being indicative of the reach of the first user 121 (e.g. while the first user 121 is holding the tool that includes the tool sensor 107). A reach of the first user 121 may comprise a reach of an arm of the first user 121, for example from a body of the first user 121 to the hand and/or glove of the first user 121. Hence, when the first user 121 is holding a tool, the reach of the first user 121 is extended by a distance from the hand holding the tool to a distal end of the tool that extends away from the first user 121, and hence the tool sensor 107 may be disposed at this distal end of the tool. Thus, the path 124 of the first user 121 may be determined using the location sensor 103, and one or more of a reach of the first user 121 and a hand location of the first user 121 may be determined from the sensors 105, 107.

Each of the sensors 105, 107 may comprise a combination of one or more of a motion sensor, a position sensor (including, but not limited to, GPS devices, and the like) and the like, which generate data indicative of one or more of a reach of the first user 121 and a hand location of the first user 121. The sensors 105, 107 may generate sensor data indicative of reach and/or hand position relative to the first user 121, and/or the sensors 105, 107 may generate sensor data indicative of reach and/or hand position in GPS coordinates and the like. When the sensors 105, 107 generate sensor data indicative of reach and/or hand position relative to the first user 121, the sensors 105, 107 may include, but are not limited to, accelerometers, magnetometers, gyroscopes, and the like; when the sensors 105, 107 generate sensor data indicative of reach and/or hand position in GPS coordinates and the like, the sensors 105, 107 may include, but are not limited to, GPS sensors, and the like.

In some examples where the location sensor 103 (and/or one or more of the sensors 105, 107) comprises a GPS sensor and the like, for the location sensor 103 to function, the location sensor 103 communicates with satellites and the like. However, as the location 123 may be a room in an interior of a building, the location sensor 103 may have no communication and/or limited communication with satellites and hence the path 124 may not be trackable with a GPS device of the location sensor 103; in some of these examples, an indoor tracking device of the location sensor 103 may then be used to track the path 124 of the user 121. In yet further examples, the location 123 may comprise beacons which emit a signal trackable by beacon tracking sensor of the location sensor 103, However, in other examples, the system 100 comprises one or more location sensors 109 not associated with the first user 121, and which may be configured to determine the path of the first user 121. For example, each of the location sensors 109 may be indoor location tracking sensors mounted in the location 123 which generate location sensor data indicative of the path 124 of the first user 121; such location sensors 109 may be mounted (e.g. as depicted) in the location 123 and/or the location sensors 109 maybe external to the location 123. For example, the location sensors 109 may comprise triangulation devices which communicate with the communication device 111 to determine the path 124 of the first user 121 via triangulation techniques, and the like; as such, the location sensors 109 may comprise components of a wireless communication network, including, but not limited to, WiFi base stations, cellphone base stations, and the like.

Similarly, in some examples, the location sensors 109 may also be used to track the position of one or more of the sensors 105, 107. For example, one or more of the sensors 105, 107 may comprise radio devices configured to communicate with the sensors 109 (e.g. WiFi base stations, cellphone base stations, and the like), and sensor data from the sensors 109 may be used to determine positions of one or more of the sensors 105, 107 using triangulation techniques, and the like.

While four location sensors 109 are depicted, the system 100 may comprise fewer than four location sensors 109 (e.g. as few as three location sensors 109 when the location sensors 109 are used for triangulation) or more than four location sensors 109. However, the location sensors 109 may be any type of sensor configured to determine the path 124 of the first user 121.

Indeed, sensor data received from one or more of the sensors 103, 109 may include one or more of: location sensor data indicative of the path 124 of the first user 121; Global Positioning Sensor (GPS) data indicative of the path 124 of the first user 121; and indoor positioning tracking data indicative of the path 124 of the first user 121. For example, when the sensor data comprises indoor positioning tracking data that may be received from the sensors 109, the sensors 109 may be specifically installed at the location 123 to track positions of users in the location 123.

As depicted, the system 100 further includes the sensor 108, worn by the first user 121, the sensor 108 comprising a sensor for mapping the location 123; for example, the mapping sensor 108 may comprise one or more of a thermal imaging device (e.g. a thermal imaging camera) camera, a radio detection and ranging (RADAR) sensor, a light detection and ranging (LIDAR) device which respectively generate thermal imaging data of the location 123, radio detection and ranging data of the location 123, and light detection and ranging data of the location 123. Hence, the sensor data from the mapping sensor 108 may be at least partially indicative of one or more of objects at the location 123 (e.g. such as an object 160 located (e.g. a bed) in the location 123) and a perimeter of the location 123 (e.g. such as walls of the location 123).

As depicted, the system 100 further comprises: at least one notification device associated with the second user 122, including, but not limited to, a display screen 125 and an audio device 128, such as a speaker, a remote speaker microphone (RSM) and the like. In some examples, the display screen 125 and/or the audio device 128 may be components of a heads-up display and/or smart glasses worn by the second user 122.

As depicted, the system 100 further comprises a sensor 129 which may comprise a location tracking device and/or location sensor of the second communication device 112, such as a GPS device, and the like, similar to the location sensor 103. The location sensor 129 may be used to determine a respective path and/or location of the second user 122. Alternatively, the respective path and/or location of the second user 122 may be determined using the location sensors 109. The location sensor 129 may be internal or external to the second communication device 112.

Furthermore, second communication device 112, the display screen 125, the audio device 128 and the location sensor 129 may form a personal area network, with communications between the personal area network and the computing device 101 occurring via the second communication device 112, and a communications network 130.

As depicted, the system 100 further comprises a supervisor computing device 133 associated with another second user 143, such as a supervisor of the users 121, 122. The supervisor computing device 133 comprises at least one notification device associated with the other second user 143, including, but not limited to, a display screen 145 and an audio device 148 (e.g. a speaker and the like). The supervisor computing device 133 may be configured to communicate with the users 121, 122, for example to manage an incident at the location 123, which may include, but is not limited to, dispatching the users 121, 122 to the location 123. However, the supervisor computing device 133 need not be associated with a supervisor, but may be any type of computing device used by the second user 143, who may have a role and/or designation other than being a supervisor.

As depicted, the system 100 further comprises a building repository 151 (e.g. a database and/or computing device) comprising at least one memory 152 storing a map 153 of the location 123. For example, the map 153 may comprise building plans of a building in which the location 123 is located. Indeed, many jurisdictions have bylaws requiring that building plans of office buildings, multi-tenant buildings, new buildings, and the like be stored in association with a pre-fire plan such that when a fire, and the like, occurs at a building, the building plans and/or the pre-fire plan is accessible to first responders. Hence, the computing device 101 may retrieve the map 153 from the at least one memory 152 via the network 130.

In general, the computing device 101 is in communication with other components of the system 100 via the network 130, using respective wired and/or wireless communication links depicted in system 100 as arrows between the components of the system 100 and the network 130. For example, as depicted, the computing device 101 is configured to communicate with the communication devices 111, 112 (and/or respective personal area networks), the location sensors 109, the supervisor computing device 133 and the building repository 151.

Furthermore, while the system 100 is depicted with a specific set of sensors, the system 100 may comprise any sensors configured to track: a path of a user (e.g. the first user 121); and one or more of a reach of the user and hand location of the user. Furthermore, the computing device 101 is generally configured to communicate with one or more sensors, the one or more sensors configured to track: a path of a user (e.g. the first user 121); and one or more of a reach of the user and hand location of the user. Furthermore, while in examples herein such sensors are described as being configured to track the path 124 of the first user 121 and one or more of a reach of the first user 121 and hand location of the first user 121, the system 100 may comprise one or more sensors configured to track a path of the second user 122 and one or more of a reach of the second user 122 and hand location of the second user 122. Indeed, in some examples, the system 100 may comprise at least one sensor configured to track a path and one or more of a reach and hand location of any users searching the location 123.

Figure 2:
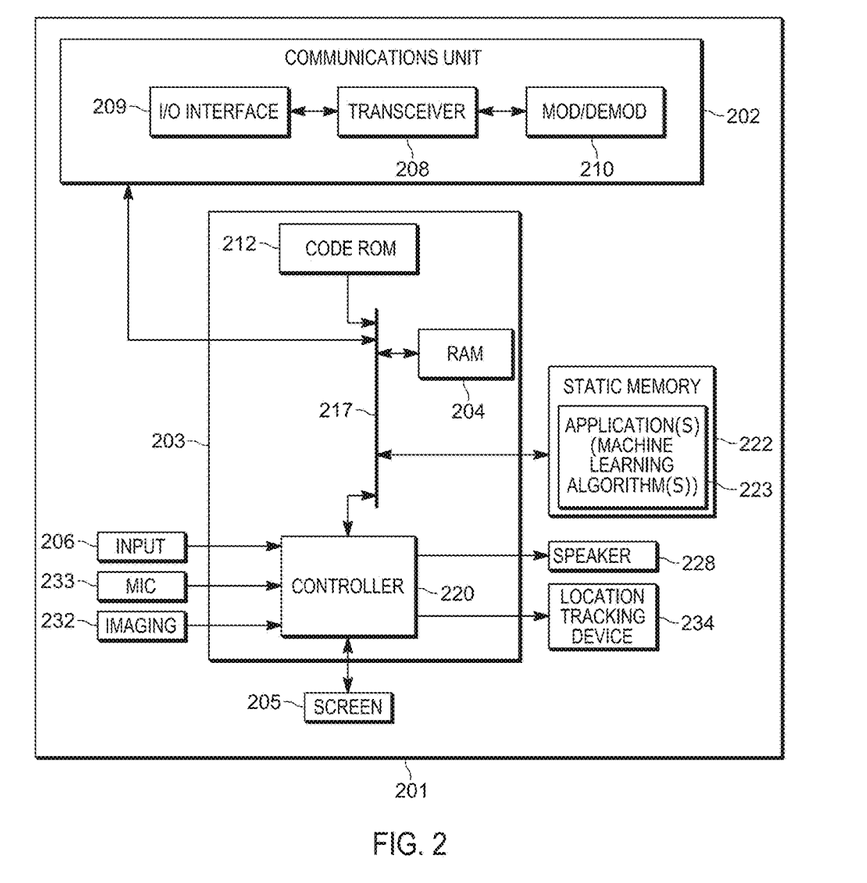
FIG. 2 depicts an example computing device for causing a notification device to provide an indication of a searched area in according with some examples.

Attention is next directed to FIG. 2 which sets forth a schematic diagram that illustrates an example of a computing device 201 for causing a notification device to provide an indication of a searched area, interchangeably referred to hereafter as the device 201 and/or the example device 201. The computing device 101 may have a configuration similar to the example device 201. Furthermore, the communication devices 111, 112 and/or the supervisor computing device 133 may have a configuration similar to the example device 201. However, while the example device 201 is described with respect to including certain components, it is understood that the example device 201 may be configured according to the functionality of a specific device, for example the computing device 101 and/or the communication devices 111, 112 and/or the supervisor computing device 133. Indeed, the configuration of the example device 201 may be adapted for a particular respective configuration of the computing device 101 and/or the communication devices 111, 112 and/or the supervisor computing device 133. For example, the computing device 101 may not include input devices and/or output devices (such as a display screen, speakers, microphones, keyboards and the like) and/or a GPS unit and/or the supervisor computing device 133 may not include a GPS unit.

As depicted in FIG. 2, the example device 201 generally includes a communications unit 202, a processing unit 203, a Random Access Memory (RAM) 204, a display screen 205, an input device 206, one or more wireless transceivers 208, one or more wired and/or wireless input/output (I/O) interfaces 209, a combined modulator/demodulator 210, a code Read Only Memory (ROM) 212, a common data and address bus 217, a controller 220, a static memory 222 storing one or more applications 223 (which may include one or more machine learning algorithms) a speaker 228, an imaging device 232, a microphone 233 and a location tracking device 234 (such as a GPS unit, and/or indoor location tracking sensors). The one or more applications 223 will be interchangeably referred to hereafter as the application 223, though different applications 223 may be used for different modes of the example device 201, as described in further detail below.

The example device 201 is described hereafter in further detail. As shown in FIG. 2, the example device 201 includes the communications unit 202 coupled to the common data and address bus 217 of the processing unit 203. The display screen 205 may include any suitable combination of flat panel display screens, and the like. The example device 201 may also include the one or more input devices 206 (e.g., keypad, pointing device, touch-sensitive surface, etc.) and the display screen 205 (which, in some examples, may be a touch screen and thus also act as an input device 206), each coupled to be in communication with the processing unit 203.

The speaker 228 may be present for reproducing audio that is decoded from voice or audio streams of calls received via the communications unit 202 for example to provide navigation instructions.

The imaging device 232 may provide video (still or moving images) of an area in a field of view of the example device 201 for further processing by the processing unit 203 and/or for further transmission by the communications unit 202.

The microphone 233 may be present for capturing audio from a user and/or other environmental or background audio that is further processed by the processing unit 203 and/or is transmitted as voice or audio stream data, or as acoustical environment indications, by the communications unit 202.

The processing unit 203 may include the code Read Only Memory (ROM) 212 coupled to the common data and address bus 217 for storing data for initializing system components. The processing unit 203 may further include the controller 220 coupled, by the common data and address bus 217, to the Random-Access Memory (RAM) 204 and a static memory 222.

The communications unit 202 may include one or more wired and/or wireless input/output (I/O) interfaces 209 that are configurable to communicate with other devices, of the system 100.

For example, the communications unit 202 may include one or more wireless transceivers 208, such as a digital mobile radio (DMR) transceiver, a Project 25 (P25) transceiver, a terrestrial trunked radio (TETRA) transceiver, a Bluetooth transceiver, a Wi-Fi transceiver, for example operating in accordance with an IEEE 802.11 standard (e.g., 802.11a, 802.11b, 802.11g), an LTE transceiver, a Worldwide Interoperability for Microwave Access (WiMAX) transceiver, for example operating in accordance with an IEEE 802.16 standard, and/or another similar type of wireless transceiver configurable to communicate via a wireless radio network.

The communications unit 202 may additionally or alternatively include one or more wireline transceivers 208, such as an Ethernet transceiver, a USB transceiver, or similar transceiver configurable to communicate via a twisted pair wire, a coaxial cable, a fiber-optic link, or a similar physical connection to a wireline network. The transceiver 208 is also coupled to a combined modulator/demodulator 210. When the example device 201 comprises the computing device 101, the communications unit 202 is generally configured to communicate with the sensors 103, 105, 107, 108, 109, 129, the communication devices 111, 112, the supervisor computing device 143 as well as notification devices of the system 100.

In general, a person of skill in the art understands that the communication unit 202 is configured to communicate with one or more sensors, the one or more sensors configured to track: a path of a user; and one or more of a reach of the user and hand location of the user.

The controller 220 may include ports (e.g. hardware ports) for coupling to the display screen 205, the input device 206, the imaging device 232, the speaker 228 and/or the microphone 233.

The controller 220 includes one or more logic circuits, one or more processors, one or more microprocessors, one or more ASIC (application-specific integrated circuits) and one or more FPGA (field-programmable gate arrays), and/or another electronic device. In some examples, the controller 220 and/or the example device 201 is not a generic controller and/or a generic device, but a device specifically configured to implement functionality for causing a notification device to provide an indication of a searched area. For example, in some examples, the example device 201 and/or the controller 220 specifically comprises a computer executable engine configured to implement specific functionality for causing a notification device to provide an indication of a searched area.

The static memory 222 is a machine readable medium, and/or non-transitory memory, that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the example of FIG. 2, programming instructions (e.g., machine readable instructions) that implement the functional teachings of the example device 201 as described herein are maintained, persistently, at the memory 222 and used by the controller 220 which makes appropriate utilization of volatile storage during the execution of such programming instructions.

In particular, the memory 222 stores instructions corresponding to the application 223 that, when executed by the controller 220, enables the controller 220 to implement functionality for causing a notification device to provide an indication of a searched area. In illustrated examples, when the controller 220 executes the application 223, the controller 220 is enabled to: receive, from one or more sensors, via the communication unit 202, sensor data indicative of a path of a user at a location (e.g. from one or more of the sensors 103, 109) and one or more of the reach and the hand location of the user at the location (e.g. from one or more of the sensors 105, 107); identify, from the sensor data, an area searched by the user at the location; and cause a notification device to provide an indication of the area searched by the user.

The application 223 may include one or more machine learning algorithms which may include, but are not limited to: a generalized linear regression algorithm; a random forest algorithm; a support vector machine algorithm; a gradient boosting regression algorithm; a decision tree algorithm; a generalized additive model; neural network algorithms; deep learning algorithms; evolutionary programming algorithms; Bayesian inference algorithms, reinforcement learning algorithms, and the like.

However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like, in some public safety environments. However, any suitable machine learning algorithm is within the scope of present implementations.

Indeed, the example device 201 may initially be operated in a learning mode to "teach" the machine learning algorithm(s) of the example device 201 to identify, from sensor data, an area searched by a user at a location; later, feedback from searching may be provided to the machine learning algorithm(s) of the example device 201 to improve identification, from sensor data, an area searched by a user at a location. In this manner, the machine learning algorithm(s) of the example device 201 are taught over time to determine successful outputs from given inputs.

Furthermore, different applications 223 may correspond to different machine learning algorithms, and/or different modes of the example device 201. For example, different combinations of one or more different machine learning algorithms may be executed depending on a preconfigured and/or selected mode of the example device 201.

Furthermore, the functionality of the system 100 and/or the example device 201 may be distributed among a plurality of devices of the system 100 including, but not limited to, one or more of the computing device 101, the communication devices 111, 112 and the supervisor computing device 133.

Figure 3:
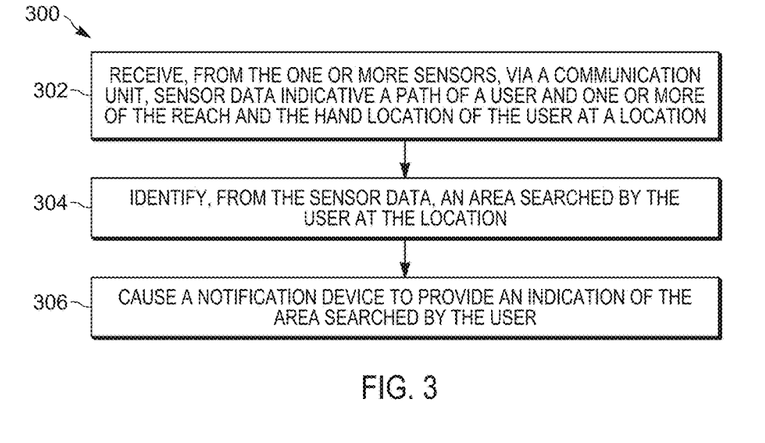
FIG. 3 depicts a flowchart of a method for causing a notification device to provide an indication of a searched area in accordance with some examples.

Attention is now directed to FIG. 3 which depicts a flowchart representative of a method 300 for causing a notification device to provide an indication of a searched area. The operations of the method 300 of FIG. 3 correspond to machine readable instructions that are executed by, for example, the example computing device 201, and specifically by the controller 220 of the example computing device 201. In the illustrated example, the instructions represented by the blocks of FIG. 3 are stored at the memory 222 for example, as the application 223. The method 300 of FIG. 3 is one way in which the controller 220 and/or the example computing device 201 and/or the system 100 is configured. Furthermore, the following discussion of the method 300 of FIG. 3 will lead to a further understanding of the system 100, and its various components. However, it is to be understood that the method 300 and/or the system 100 may be varied, and need not work exactly as discussed herein in conjunction with each other, and that such variations are within the scope of present examples.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

Furthermore, while it is understood by a person of skill in the art hereafter that the method 300 is performed at the example device 201, the method 300 may be performed at one or more of the devices of the system 100, for example at a combination of one or more of the computing device 101, the communication devices 111, 112 and the supervisor computing device 133.

At a block 302, the controller 220 of the example device 201 receives, from the one or more sensors 103, 105, 107, 109, via the communication unit 202, sensor data indicative of the path 124 and one or more of the reach and the hand location of the first user 121 (e.g. a user in FIG. 3) at the location 123. For example, the path 124 may be identified from the sensor data received from one or more of the sensors 103, 109, and one or more of the reach and the hand location of the first user 121 at the location 123 may be identified from the sensor data received from one or more of the sensors 105, 107 (and/or the sensors 109).

At a block 304, the controller 220 of the example device 201 identifies, from the sensor data, an area searched by the first user 121 at the location 123. For example, the sensor data received from one or more of the sensors 105, 107, indicative of one or more of the reach and the hand location of the first user 121 at the location 123, may be compared to the sensor data, received from one or more of the sensors 103, 109, indicative of the path 124 of the first user 121 at the location 123; any area between the reach and/or the hand location of the first user 121 and the path 124 may be identified as being searched.

In some examples, the controller 220 may have access to the at least one memory 152 storing the map 153 of the location 123, and the controller 220 may be further configured to identify, from the sensor data, the area searched by the first user 121 by: locating the path 124 at the map 153; and locating one or more of the reach and the hand location of the user at the map 153. For example, the controller 220 may retrieve the map 153 from at least one memory 152 (e.g. via the network 130).

In other examples, however, the controller 220 may not have access to the map 153. Hence, in these example, at the block 302, the controller 220 may further receive sensor data from the mapping sensor 108, such sensor data at least partially indicative of one or more of objects (e.g. such as an object 160) at the location 123 and a perimeter of the location 123. In these examples, the controller 220 may be further configured to identify, from such the sensor data, the area searched by the first user 121 by: at least partially identifying, from the sensor data, one or more of the objects and the perimeter of the location 123; and at least partially locating one or more of the path 124, the reach and the hand location of the first user 121 relative to one or more of the objects and the perimeter of the location 123.

In yet further examples, the controller 220 may combined sensor data from the mapping sensor 108 with the map 153, for example to position a location of the object 160 (e.g. identified from the sensor data from the mapping sensor 108) within the map 153.

At a block 306, the controller 220 of the example device 201 causes a notification device to provide an indication of the area searched by the first user 121.

For example, the notification device may comprise one or more of a display screen (e.g. one or more of the display screens 125, 145) and an audio device (e.g. one or more of the audio devices 128, 148), and the indication of the area searched by the first user 121 includes one or more of a visual indication, to be rendered at the display screen, and an audio indication, to be provided at the audio device.

Furthermore, the indication of the area searched by the first user 121 may depend on whether the notification device is associated with the second user 122 or the other second user 143 (and the like). Furthermore, when the notification device is caused to provide the indication of the area searched by the first user 121 may depend on whether the notification device is associated with the second user 122 or the other second user 143 (and the like), as well as a location of the second user 122.

For example, when the notification device is associated with the second user 122, the controller 220 may be further configured to cause the notification device (e.g. the display screen 125 and/or the audio device 128) to provide the indication of the area searched by the first user 121 by: receiving, via the communication unit 202, a respective location of the second user 122; and when the second user 122 is one or more of proximal the location 123 and at an entrance of the location 123, cause the notification device to provide the indication. For example, the location sensor 129 may periodically transmit the location of the second user 122 to the example device 201 (e.g. when the example device 201 is embodied as the computing device 101), and when the second user 122 is one or more of proximal the location 123 and at an entrance of the location 123, the example device 201 may cause the notification device to provide the indication of the area searched by the first user 121 by transmitting the indication of the area searched by the first user 121 to the display screen 125 and/or the audio device 128 (e.g. via the second communication device 112) such that the display screen 125 may render a visual indication and/or the audio device 128 may output an aural indication.

For example, the indication may comprise one or more of: first visual data indicative of one or more of the path 124 of the first user 121, the area searched by the first user 121, the reach of the first user 121 along the path 124, and the hand location of the first user 121; second visual data indicative of instructions for continuing a search of the location 123; and audio data indicative of the instructions for continuing the search of the location.

However, in other examples, the notification device caused to provide the indication of the area searched by the first user 121 may comprise the display screen 145 and/or audio device 148 associated with the other second user 143. Hence, the notification device may comprise the display screen 145 associated with the other second user 143, and the controller 220 may be further configured to cause the notification device to provide the indication of the area searched by the first user 121 by: causing the display screen 145 to render the indication as a map of the location 123, with areas that are searched by hand, unsearched by hand and partially searched by hand rendered differently at the map. The map rendered at the display screen 145 may comprise the map 153 retrieved by the supervisor computing device 133 from the at least one memory 152 and/or a map of a building, and the like, that includes the location 123. Alternatively, and/or in addition to, the indication of the area searched by the first user 121 may be provided as audio data at the audio device 148.

Attention is next directed to FIG. 4 to FIG. 8 which depicts examples of the method 300. In the depicted examples, the method 300 is implemented at the computing device 101 (e.g. the example device 201 is embodied in the computing device 101); however, the method 300 may be implemented in any combination of one or more of the devices of the system 100.

Figure 4:
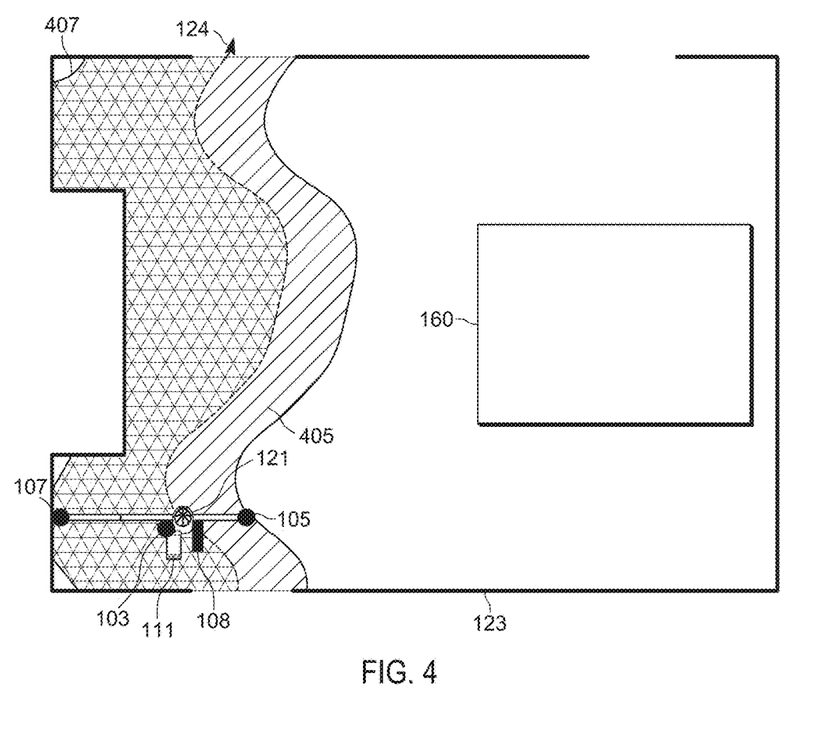
FIG. 4 depicts a location and a top view of a user moving along a path to search the location, for example in a primary search in accordance with some examples.

Attention is first directed to FIG. 4 which depicts the location 123 and a top view of the first user 121 moving along the path 124 to search the location 123, as in FIG. 1, for example in a primary search. However, in FIG. 4 the first user 121 is stretching out one arm (e.g. a right arm) with the glove sensor 105 on a glove of a respective hand, and also stretching out the other arm (e.g. a left arm) holding the tool, with the tool sensor 107 at the end of the tool; the first user 121 may be sweeping their arms and/or a tool to search the location 123.

Also depicted in FIG. 4 is the path 124, and areas 405, 407 searched by the first user 121, as the first user 121 moves along the path 124. For example, a respective inner edge of each of the areas 405, 407 (e.g. closest to and/or proximal to the first user 121) corresponds to the path 124, while a respective outer edge of each of the areas 405, 407 (e.g. away from and/or distal from the first user 121) corresponds to a respective path of the sensors 105, 107 as the first user 121 moves along the path 124. Hence, for example, the outer edge of the area 405 corresponds to a reach and/or hand location of the right hand of the first user 121, as indicated by sensor data from the glove sensor 105, and the outer edge of the area 407 corresponds to a reach of the left hand of the first user 121 while extending a tool therefrom, as indicated by sensor data from the tool sensor 107. In general, the first user 121 may use the tool to make contact and/or periodic contact with a wall of the location 123 to maintain an understanding of the perimeter; hence, an edge of the area 407 that extends away from the user 121 substantially follows a wall of the location 123.

Also depicted in FIG. 4 are the first communication device 111, the location sensor 103 and the mapping sensor 108 which may respectively be used to track and/or sense the path 124 and a map of the location 123.

Figure 5:
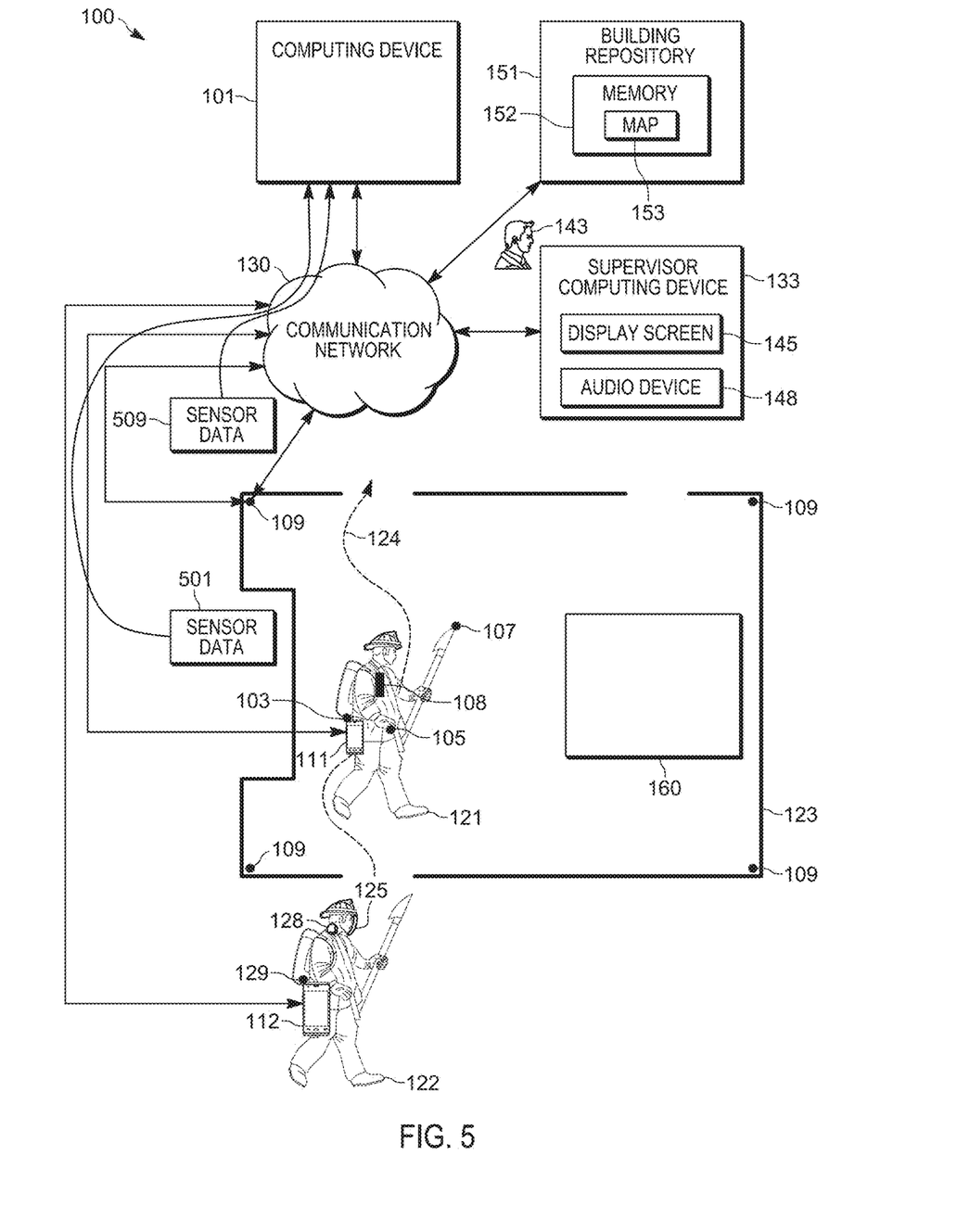
FIG. 5 depicts sensor data being received at a computing device to identify an area searched by a user at a location in accordance with some examples.

Attention is next directed to FIG. 5, which is substantially similar to FIG. 1, with like elements having like numbers. However, in FIG. 5, the first communication device 111 (and/or another device of a personal area network of the first user 121) is transmitting sensor data 501 to the computing device 101 via the network 130; similarly, the sensors 109 are transmitting sensor data 509 to the computing device 101 via the network 130. The sensor data 501, 509 is indicative of the path 124 of the first user 121; and one or more of a reach of the first user 121 and hand location of the first user 121. The sensor data 501, 509 is received (e.g. at the block 302 of the method 300) of the computing device 101. The sensor data 501, 509 is generally transmitted while the first user 121 is conducting a primary search of the location 123 (e.g. as in FIG. 4). As described above, the sensor data 509 may be optional and/or sensor data of the location sensor 103 may be optional in the sensor data 501.

Furthermore, the sensor data 501 may include mapping sensor data from the mapping sensor 108.

Figure 6:
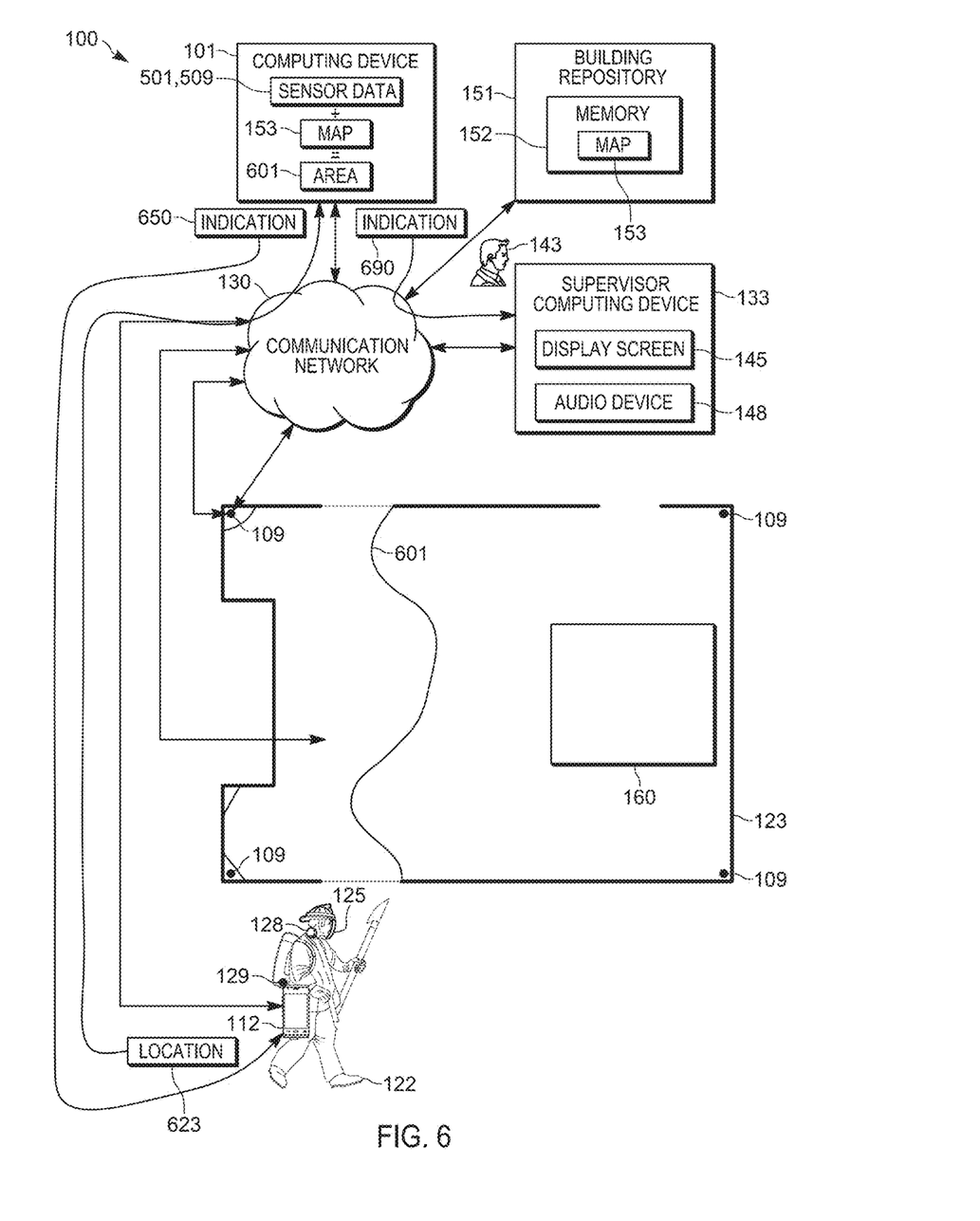
FIG. 6 depicts a computing device causing notification devices to provide an indication of an area searched by a user in accordance with some examples.

Attention is next directed to FIG. 6 which is substantially similar to FIG. 5, with like elements having like numbers. FIG. 6 depicts the system 100 after the first user 121 has conducted a primary searched of the location 123. As depicted, the computing device 101 is identifying (e.g. at the block 304 of the method 300) an area 601 searched by the first user 121, for example by combining the sensor data 501, 509 with the map 153 (e.g. retrieved from the at least one memory 152). Alternatively, mapping sensor data from the mapping sensor 108 may be used by the computing device 101 to generate map data.

As depicted in FIG. 6, the first user 121 has left the location 123, however the second user 122 is approaching the location 123 and/or is proximal the location 123 and/or is proximal an entrance to the location 123, and is preparing to perform a secondary search. The second communication device 112 transmits a location 623 of the second location sensor 129 to the computing device 101. The computing device 101 receives the location 623 and, in response, transmits an indication 650 of the area 601 searched by the first user 121. The indication 650 may be generated prior to receiving the location 623 and/or after receiving the location 623. The transmission of the indication 650 causes (e.g. at the block 304) a notification device associated with the second user 122 to provide the indication 650 of the area 601 searched by the first user 121, for example as visual data at the display screen 125 and/or as aural data at the audio device 128. Alternatively, the indication 650 may be provided at a notification device of the second communication device 112.

As depicted, the computing device 101 further transmits an indication 690 of the area 601 searched by the first user 121 to the supervisor computing device 133. The indications 650, 690 may be the same or different, as described in further detail below.

Figure 7:
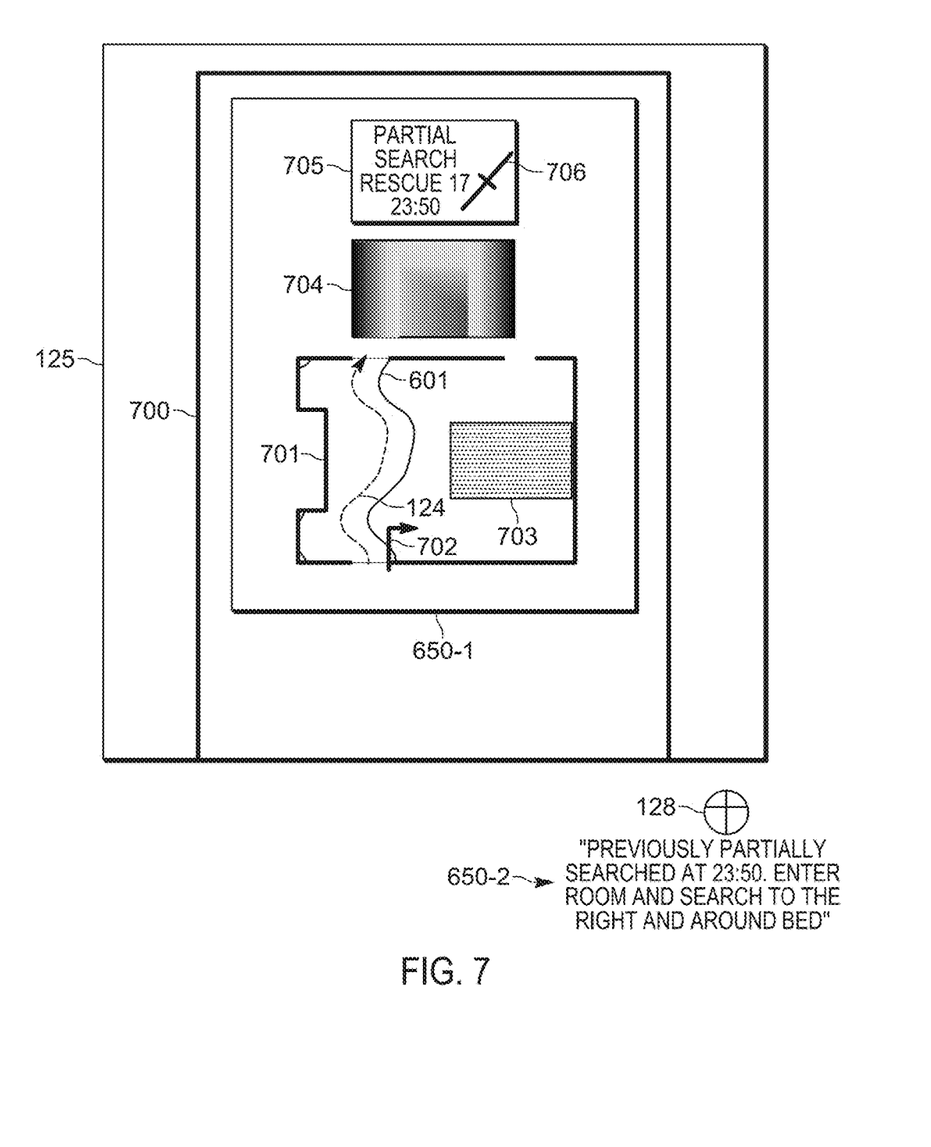
FIG. 7 depicts an example indication of an area searched by a user in a primary search provided at a notification device of a second user who is about to search the area in a secondary search in accordance with some examples.

Attention is next directed to FIG. 7 which depicts the display screen 125 rendering a visual indication 650-1 of the indication 650 and the audio device 128 providing an audio indication 650-2 of the indication 650. For example, the indications 650-1, 650-2 may be provided at a heads-up display and/or smart glasses of which the display screen 125 and the audio device 128 are components.

For example, as depicted, the visual indication 650-1 is rendered at the display screen 125 at an entrance 700 of the location 123 (e.g. the display screen 125 of the heads-up display and/or smart glasses may be transparent and/or the heads-up display and/or smart glasses includes a camera (not depicted) which captures an image of the entrance 700 and renders the image at the display screen 125 along with the visual indication 650-1.

As depicted the visual indication 650-1 comprises first visual data 701 indicative of one or more of the path 124 of the first user 121, the area 601 searched by the first user 121, the reach of the first user 121 along the path 124, and the hand location of the first user 121. For example, as depicted, the first visual data 701 comprises a map of the location 123 (e.g. the map 153) with the path 124 and the area 601 indicated thereupon (e.g. a combination of the areas 405, 407).

As depicted, the visual indication 650-1 further comprises second visual data 702 indicative of instructions for continuing a search of the location 123. For example, as depicted the visual indication 650-1 comprises an arrow on a map of the location 123 indicating a direction of an unsearched area of the location 123, for example to the right of the area 601 and/or the path 124. In some examples, unsearched areas such as that shown to the right of area 601 in FIG. 7 may be separately shaded or otherwise colored or visually indicated to illustrate areas not searched by hand in one or more prior tracked searches.

As depicted, the visual indication 650-1 further comprises third visual data 703 indicative of an object (e.g. the object 160) to be searched. The third visual data 703 may comprise an outline, and the like, of at least a portion of the object on a map of the location 123, the third visual data 703 generated from RADAR and/or LIDAR data received from the mapping sensor 108, and the like.

As depicted, the visual indication 650-1 further comprises fourth visual data 704 comprising a thermal image map of the location 123 that was previously acquired by the mapping sensor 108 when the first user 121 was in a similar location as the second user 122 when the visual indication 650-1 is being provided. Indeed, when the mapping sensor 108 comprises a thermal imaging device, the thermal imaging device may acquire thermal images of the location 123 along the path 124. The fourth visual data 704 may hence be updated with thermal image maps previously acquired at different positions along the path 124, as the second user 122 moves along the path 124. When the second user 122 does not move along the path 124 (e.g. by moving in the direction of the arrow of the second visual data 702), the thermal image map may be removed from the display screen 125.

As depicted, the visual indication 650-1 further comprises fifth visual data 705 comprising an indication of the location 123 having been partially searched (e.g. "Partial Search" and/or a symbol 706 indicating a partial search), as well as an identifier of the first user 121 and/or a team of the first user 121 (e.g. "Rescue 17") and/or a time the location 123 was partially searched (e.g. "23:50"). The symbol 706 may be one of a plurality of search markings and/or standardized search markings used by search crews and/or fire crews to indicate whether an area is searched, partially searched or unsearched; such symbols may further indicate whether a location and/or area is searched by hand, partially searched by hand or unsearched by hand.

However, any information that may be used to assist the second user 122 in conducting a secondary search of the location 123 is within the scope of the present specification.

As depicted, the aural indication 650-2 comprises sound that includes the words "Previously Partially Searched at 23:50. Enter Room And Search To The Right And Around Bed". Hence, the aural indication 650-2 includes similar information as the second visual data 702, the third visual data 703, and the fifth visual data 705. However, any information in the indication 650 that may be indicated in aural data is within the scope of the present specification.

Figure 8:
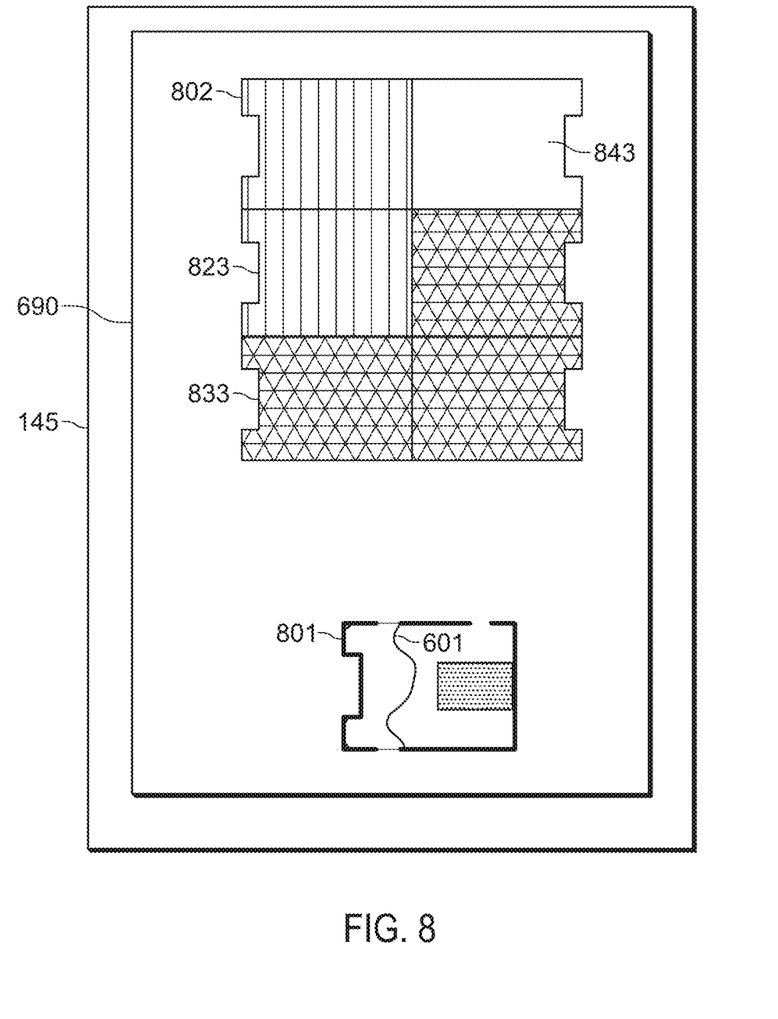
FIG. 8 depicts an example indication of areas searched by users provided at a notification device of a second user who is supervising a search of a location in accordance with some examples.

Attention is next directed to FIG. 8 which depicts the display screen 145 at the supervisor computing device 133 rendering the indication 690. As depicted, the indication 690 comprises a visual indication, however the indication 690 may comprise an aural indication. As depicted, the indication 690 comprises a first visual indication 801 similar to the first visual indication 701, and specifically showing the searched area 601 of the location 123 on a map of the location 123.

However, as depicted, the indication 690 further comprises a map 802 of the location 123, the map 802 comprising a floorplan of a building that includes an area and/or a region 823 corresponding to the location 123. The map 802 further includes: areas and/or regions that are searched (which may include, but are not limited to, by hand search indications and/or mere presence search indications without hand search indications); areas and/or regions that are unsearched (which may include, but are not limited to, not searched at all indications (no presence) and/or no hand search indications); and areas and/or regions that are partially searched (which may include, but are not limited to, partially searched by hand, but not fully searched by hand indications, and/or searched (e.g. mere presence) but no hand search indications) rendered differently at the map 802.

For example, the region 823 corresponding to the location 123 is marked with a first pattern indicating that the location 123 is partially searched, while an area and/or a region 833 corresponding to another location in the building (e.g. another room) is marked with a second pattern indicating that the region 833 is searched, and an area and/or a region 843 corresponding to yet another location in the building (e.g. yet another room) is marked with a third pattern indicating that the region 843 is unsearched.

The region 823 may further include one or more patterns and/or indications indicating areas that are partially searched by hand, but not fully searched by hand, and/or areas that partially searched via presence (e.g. a user walks through a region) but which were not searched by hand.

Similarly, the region 833 may further include one or more patterns and/or indications indicating areas that are searched by hand, and/or areas that are searched via presence (e.g. a user walks through a regions).

Similarly, the region 833 may further include one or more patterns and/or indications indicating areas that are not searched at all and/or areas that were not searched by hand.

Alternatively, locations that are searched, unsearched and partially searched may be provided as aural indications using the audio device 148 (e.g. sound such as "Room 123 has been partially searched, but Room 843 requires searching", and the like). Furthermore, while different patterns are used to indicate locations that are searched, unsearched or partially searched, different colors, and the like may be used to in place of, and/or in addition to, the patterns.

While present examples depict only the location 123 of the building of the map 802 being partially searched, the present specification includes the computing device 101 receiving sensor data from more than one user searching locations in the building of the map 802 and updating the indication 690 and/or the map 802 accordingly. For example, as the first user 121 exits the location 123 into another location of the building, the sensors described herein continue to upload sensor data to the computing device 101 such that the computing device 101 can identify other areas and/or regions searched by the first user 121 at other locations.

Similarly, components of the second user 122 may also be equipped with sensors similar to the sensors of the first user 121; hence sensor data indicating a path of the second user 122 and one or more of the reach of the second user 122 and the hand location of the second user 122 may also be received at the computing device 101 such that the computing device 101 may also identify, from the sensor data, areas searched by the second user 122. For example, as the second user 122 enters the location to perform a secondary search, the areas of the location 123 searched by the second user 122 may be identified; in these examples, the indication 690 and/or the map 802 (and/or indications similar to the indication 650) may be updated to identify that the location 123 has been changed from partially searched to searched (e.g. fully searched). Indeed, while only two users 121, 122 are described herein as searching locations, any number of users with associated sensors may search locations, and the indication 690 and/or the map 802 (and/or indications similar to the indication 650) updated accordingly.

The map 802 may hence be used by the other second user 143, who may be in message and/or voice communication with the users 121, 122 (e.g. via the supervisor computing device 133 and the communication devices 111, 112), to provide instructions to the users 121, 122 for searching the building that includes the location 123.

Hence, provided herein is a device, system and method for causing a notification device to provide an indication of a searched area. For example, by causing a notification device to provide an indication of the area searched by a user, other users and/or supervisors thereof, and the like, may better search locations in emergency situations, and the like, which may lead to better use of both human resources and technical resources during the search (e.g. radio communications may be reduced as the searching may become more efficient as compared to instances where notification devices are not caused to provide an indication of a searched area).

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A device comprising:
   a communication unit configured to communicate with one or more sensors, the one or more sensors configured to track: a path of a user; and one or more of a reach of the user and hand location of the user; and
   a controller communicatively coupled to the communication unit, the controller configured to:
      receive, from the one or more sensors, via the communication unit, sensor data indicative of the path and one or more of the reach and the hand location of the user at a location;
      identify, from the sensor data, an area searched by the user at the location; and
      cause a notification device to provide an indication of the area searched by the user.

2. The device of claim 1, wherein the controller has access to at least one memory storing a map of the location, the controller being further configured to identify, from the sensor data, the area searched by the user by:
   locating the path at the map; and
   locating one or more of the reach and the hand location of the user at the map.

3. The device of claim 1, wherein the sensor data is further at least partially indicative of one or more of objects at the location and a perimeter of the location, and the controller is further configured to identify, from the sensor data, the area searched by the user by:
   at least partially identifying, from the sensor data, one or more of the objects and the perimeter of the location; and
   at least partially locating one or more of the path, the reach and the hand location of the user relative to one or more of the objects and the perimeter of the location.

4. The device of claim 1, wherein the sensor data comprises one or more of:
   location sensor data indicative of the path of the user;
   Global Positioning Sensor (GPS) data indicative of the path of the user; and
   indoor positioning tracking data indicative of the path of the user.

5. The device of claim 1, wherein the sensor data comprises one or more of:
   glove sensor data indicative of one or more of the reach and the hand location of the user while the user is wearing a glove that includes at least one of the one or more sensors; and
   tool sensor data indicative of the reach of the user while the user is holding one or more tools that includes at least one of the one or more sensors;
   thermal imaging data of the location;
   Radio Detection and Ranging (RADAR) data of the location; and
   Light Detection and Ranging (LIDAR) data of the location.

6. The device of claim 1, wherein the notification device comprises one or more of a display screen and an audio device, and the indication of the area searched by the user includes one or more of a visual indication, to be rendered at the display screen, and an audio indication, to be provided at the audio device.

7. The device of claim 1, wherein the notification device is associated with a second user, and the controller is further configured to cause the notification device to provide the indication of the area searched by the user by:
   receiving, via the communication unit, a respective location of the second user; and
   when the second user is one or more of proximal the location and at an entrance of the location, cause the notification device to provide the indication.

8. The device of claim 1, wherein the notification device comprises a display screen associated with a second user, and the controller is further configured to cause the notification device to provide the indication of the area searched by the user by:
   causing the display screen to render the indication as a map of the location, with areas that are searched by hand, unsearched by hand and partially searched by hand rendered differently at the map.

9. The device of claim 1, wherein the indication comprises one or more of:
   first visual data indicative of one or more of the path of the user, the area searched by the user, the reach of the user along the path, and the hand location of the user;
   second visual data indicative of instructions for continuing a search of the location; and
   audio data indicative of the instructions for continuing the search of the location.

10. A method comprising:
    receiving, at a controller, from one or more sensors, via a communication unit, sensor data indicative of a path and one or more of a reach and a hand location of a user at a location, the communication unit configured to communicate with the one or more sensors, and the one or more sensors configured to track: the path of the user; and one or more of the reach of the user and the hand location of the user;
    identifying, at the controller, from the sensor data, an area searched by the user at the location; and
    causing, using the controller, a notification device to provide an indication of the area searched by the user.

11. The method of claim 10, wherein the controller has access to at least one memory storing a map of the location, the method further comprises identifying, at the controller, from the sensor data, the area searched by the user by:
    locating the path at the map; and
    locating one or more of the reach and the hand location of the user at the map.

12. The method of claim 10, wherein the sensor data is further at least partially indicative of one or more of objects at the location and a perimeter of the location, the method further comprises identifying, at the controller, from the sensor data, the area searched by the user by:
    at least partially identifying, from the sensor data, one or more of the objects and the perimeter of the location; and at least partially locating one or more of the path, the reach and the hand location of the user relative to one or more of the objects and the perimeter of the location.

13. The method of claim 10, wherein the sensor data comprises one or more of:
   location sensor data indicative of the path of the user;
   Global Positioning Sensor (GPS) data indicative of the path of the user; and
   indoor positioning tracking data indicative of the path of the user.

14. The method of claim 10, wherein the sensor data comprises one or more of:
   glove sensor data indicative of one or more of the reach and the hand location of the user while the user is wearing a glove that includes at least one of the one or more sensors; and
   tool sensor data indicative of the reach of the user while the user is holding one or more tools that includes at least one of the one or more sensors;
   thermal imaging data of the location;
   Radio Detection and Ranging (RADAR) data of the location; and
   Light Detection and Ranging (LIDAR) data of the location.

15. The method of claim 10, wherein the notification device comprises one or more of a display screen and an audio device, and the indication of the area searched by the user includes one or more of a visual indication, to be rendered at the display screen, and an audio indication, to be provided at the audio device.

16. The method of claim 10, wherein the notification device is associated with a second user, the method further comprises causing, using the controller, the notification device to provide the indication of the area searched by the user by:
   receiving, via the communication unit, a respective location of the second user; and
   when the second user is one or more of proximal the location and at an entrance of the location, cause the notification device to provide the indication.

17. The method of claim 10, wherein the notification device comprises a display screen associated with a second user, the method further comprises causing, using the controller, the notification device to provide the indication of the area searched by the user by:
   causing the display screen to render the indication as a map of the location, with areas that are searched by hand, unsearched by hand and partially searched by hand rendered differently at the map.

18. The method of claim 10, wherein the indication comprises one or more of:
   first visual data indicative of one or more of the path of the user, the area searched by the user, the reach of the user along the path, and the hand location of the user;
   second visual data indicative of instructions for continuing a search of the location; and
   audio data indicative of the instructions for continuing the search of the location.

\* \* \* \* \*